(12) United States Patent
Gong

(10) Patent No.: US 9,499,030 B1
(45) Date of Patent: Nov. 22, 2016

(54) VEHICLE SUNSHADE APPARATUS

(71) Applicant: CREATIVE & COOPERATIVE INTERNATIONAL, INC., Taipei (TW)

(72) Inventor: Jing-Shyong Gong, Taipei (TW)

(73) Assignee: CREATIVE & COOPERATIVE INTERNATIONAL, INC., Taipei (TW)

( * ) Notice: Subject to any disclaimer, the term of this patent is extended or adjusted under 35 U.S.C. 154(b) by 0 days.

(21) Appl. No.: 14/723,184

(22) Filed: May 27, 2015

(51) Int. Cl.
*B60J 1/08* (2006.01)
*B60J 3/02* (2006.01)
*B60J 1/20* (2006.01)

(52) U.S. Cl.
CPC .............. *B60J 3/02* (2013.01); *B60J 1/2011* (2013.01)

(58) Field of Classification Search
CPC ...................................... B60J 1/2011
USPC .............................. 160/370.21, 105
See application file for complete search history.

(56) References Cited

U.S. PATENT DOCUMENTS

| | | | | |
|---|---|---|---|---|
| 3,805,872 A * | 4/1974 | Lorber | ................ | B60J 1/2011 160/354 |
| 5,042,551 A * | 8/1991 | Ein | ................ | B60J 1/2011 160/370.21 |
| 5,116,273 A * | 5/1992 | Chan | ................ | A45B 23/00 160/370.21 |
| 5,253,695 A * | 10/1993 | Nenstiel | ................ | B60J 1/2091 160/105 |
| 5,553,908 A * | 9/1996 | Shink | ................ | B60J 11/08 160/370.21 |
| 5,911,266 A * | 6/1999 | Jacobs | ................ | A47H 13/00 160/330 |
| 6,073,675 A * | 6/2000 | Dannaher | ................ | E06B 9/52 160/354 |
| 7,131,683 B1 * | 11/2006 | Gong | ................ | B60J 1/2011 160/368.1 |
| 8,365,799 B2 * | 2/2013 | Harris | ................ | H01F 7/0252 160/105 |
| 9,186,961 B2 * | 11/2015 | Gong | ................ | B60J 1/2011 |
| 9,272,605 B1 * | 3/2016 | Gong | ................ | B60J 1/08 |

FOREIGN PATENT DOCUMENTS

TW M287752 U 2/2006
TW M359435 U1 6/2009

* cited by examiner

*Primary Examiner* — David Purol
(74) *Attorney, Agent, or Firm* — Muncy, Geissler, Olds & Lowe, P.C.

(57) ABSTRACT

A vehicle sunshade apparatus includes an anchor element and a sunshade. The anchor element includes a body, a magnet located in the body and a ladder portion formed on the surface of the body. The ladder portion includes a first platform and a confining wall adjacent to the first platform. The sunshade includes a sunshade screen and a frame surrounding the sunshade screen that can be magnetized. When the sunshade is coupled on the ladder portion, the frame leans on the confining wall and the first platform and is attracted by the magnet. The first platform corresponds to the junction of the sunshade screen and the frame.

8 Claims, 14 Drawing Sheets

VEHICLE SUNSHADE APPARATUS

FIELD OF THE INVENTION

The present invention relates to a vehicle sunshade apparatus and particularly to a vehicle sunshade apparatus with sunshades designed to match vehicle window dimensions.

BACKGROUND OF THE INVENTION

Due to global warming and damage of ozonosphere in recent years the high temperature and ultraviolet rays generated by sun have become a great threat to the safety and health of human body. To prevent or alleviate such threat a wide variety of vehicle sunshade apparatus have been developed and marketed. For instance, Taiwan utility patent No. M287752, referring to FIG. 1, provides a sunshade holding structure which has a plurality of anchor blocks 4 with a trough formed in the center of each one that can be positioned on a vehicle body through a double-sided adhesive tape, then a flexible sunshade screen 5 can be inserted into the trough for anchoring to block sunshine outside the window. However, when in use for removing the sunshade screen 5 the anchor blocks 4 could be inadvertently peeled off. Taiwan utility patent No. M359435, referring to FIG. 2, proposed another type of sunshade. It includes a sunshade sheet 6 and a plurality of brackets 7. Each bracket 7 has a base blade 71, a side blade 72 and a bonding sheet 73 at the bottom end of the base blade 71. Through such a structure the sunshade sheet 6 and the brackets 7 can be easily assembled and disassembled, therefore resolve the problem of loosening away of the anchor blocks 4 caused by the inadvertent removing of the sunshade of the previous technique shown in FIG. 1. In addition, Honda Motor Co., Ltd. also provides a vehicle trunk covering on its vehicle model HR-V. It has two C-shaped grooves on side walls of the trunk for installation of a covering panel by wedging. It also can provide sunshade function.

However, the conventional sunshade anchor elements and bonding sheet 73 adopted in the previous techniques shown in FIGS. 1 and 2 are mounted onto the vehicle body and make the vehicle body thicker. As a result, the sunshade has to be made in a size smaller than the interior space of the vehicle body to be wedged in the aforesaid anchor blocks 4 or the brackets 7. This creates gaps between the sunshade and the vehicle body, hence cannot fully block the light, or the border frame of the sunshade has to form grooves to accommodate the thickness of the anchor elements. As to the coupling of the C-shaped grooves and the covering panel provided by the vehicle model mentioned above, noise could be generated due to impact between them caused by vehicle body vibration during driving. Hence all the prior techniques still leave a lot to be desired. There are still rooms for improvement.

SUMMARY OF THE INVENTION

The primary object of the present invention is to solve the problem of the conventional sunshade assembly of unable to fully block light or generating noise during driving of the vehicles.

To achieve the foregoing object the invention provides a vehicle sunshade apparatus that includes an anchor element and a sunshade which is operable to couple with a ladder portion of the anchor element. The anchor element includes a body, a magnet located in the body and the ladder portion formed on the surface of the body. The ladder portion includes a first platform and a confining wall adjacent to the first platform. The sunshade includes a sunshade screen and a frame surrounding the sunshade screen that can be magnetized. When the sunshade is coupled on the ladder portion the frame leans on the confining wall and the first platform and attracted by the magnet. The first platform corresponds to the junction of the sunshade screen and the frame.

In one aspect the ladder portion includes a second platform which is connected to the confining wall and forms a stair difference against the first platform. The anchor element further includes a coupling portion located on the second platform.

In another aspect the coupling portion is a double-sided adhesive tape or hook & loop fastener.

In yet another aspect the second platform has a recess to hold the coupling portion, and the recess is formed at a depth slightly smaller or equal to the thickness of the coupling portion.

In yet another aspect the sunshade further includes a covering layer to cover the frame, and the frame is formed at a thickness greater than the thickness of the sunshade screen.

In yet another aspect the covering layer has at least one opening formed between the frame and the sunshade screen to allow the first platform to pass through.

In yet another aspect the first platform has an anti-skid portion at one side facing the confining wall.

In yet another aspect the magnet is located in the body abutting the confining wall with a magnetic pole facing the confining wall.

In yet another aspect the body is flexible and made from plastics or rubber.

Thus, compared with the prior techniques, the invention can provide many advantages, notably:

1. The anchor element is located between the sunshade and a vehicle window, the magnet can generate a horizontal attraction force to anchor the sunshade on the vehicle body, hence can overcome the problem of increasing the vehicle body thickness of the conventional techniques that have the anchor element located between the sunshade and the vehicle body that results in not fully mutual matching and covering and forming gaps between them. In addition, the sunshade can be designed and made in a size and shape to match a corresponding window frame intended for installation without an extra thickness to form grooves to hold the anchor element, hence also can save fabrication cost.

2. The anchor element of the invention provides a horizontal attraction force to attract the sunshade through the magnet, and the first platform provides a vertical support force for the sunshade, hence the sunshade and the anchor element can form secure coupling between them during driving of the vehicles. Moreover, the attraction force generated by the magnet also can prevent the sunshade from wobbling during vehicle driving, thus can further improve the problem of noise generation that occurs between the trunk covering and the grooves of the conventional technique.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
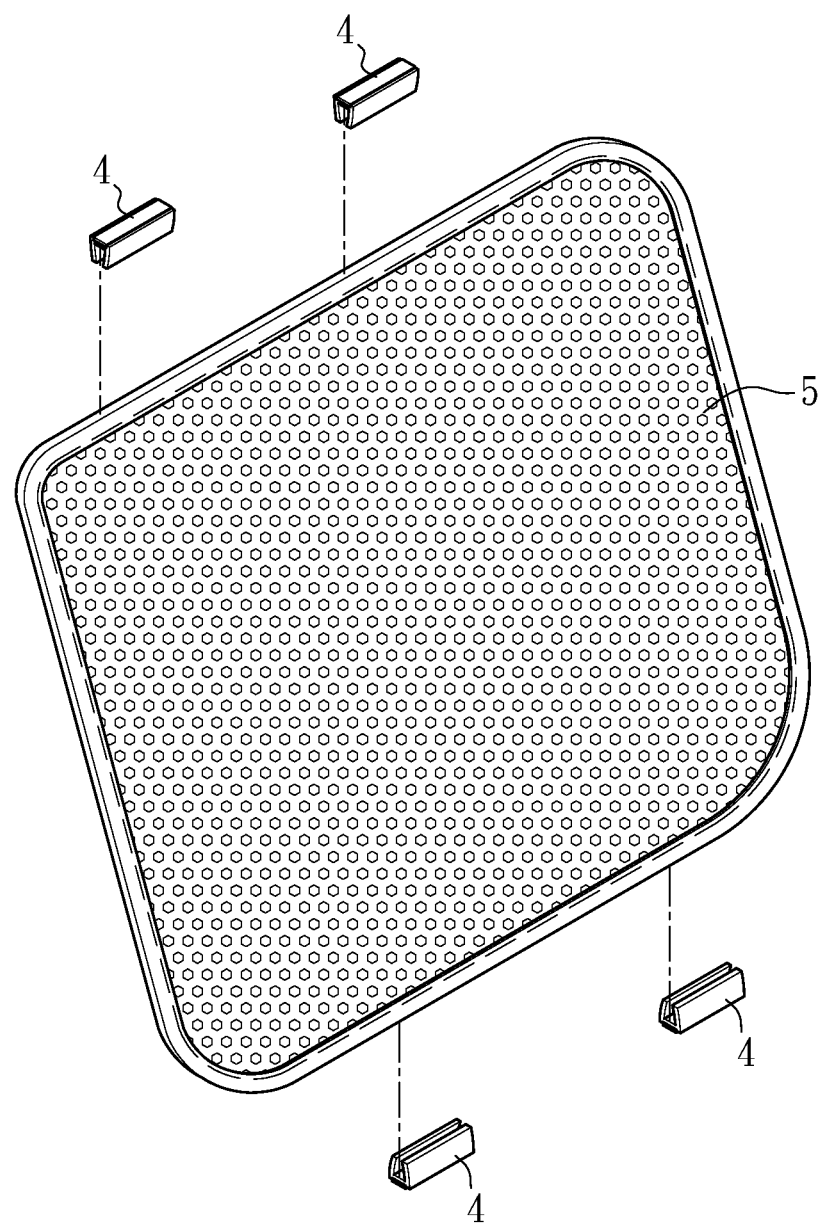
FIG. 1 is an exploded view of a conventional sunshade.
Figure 2:
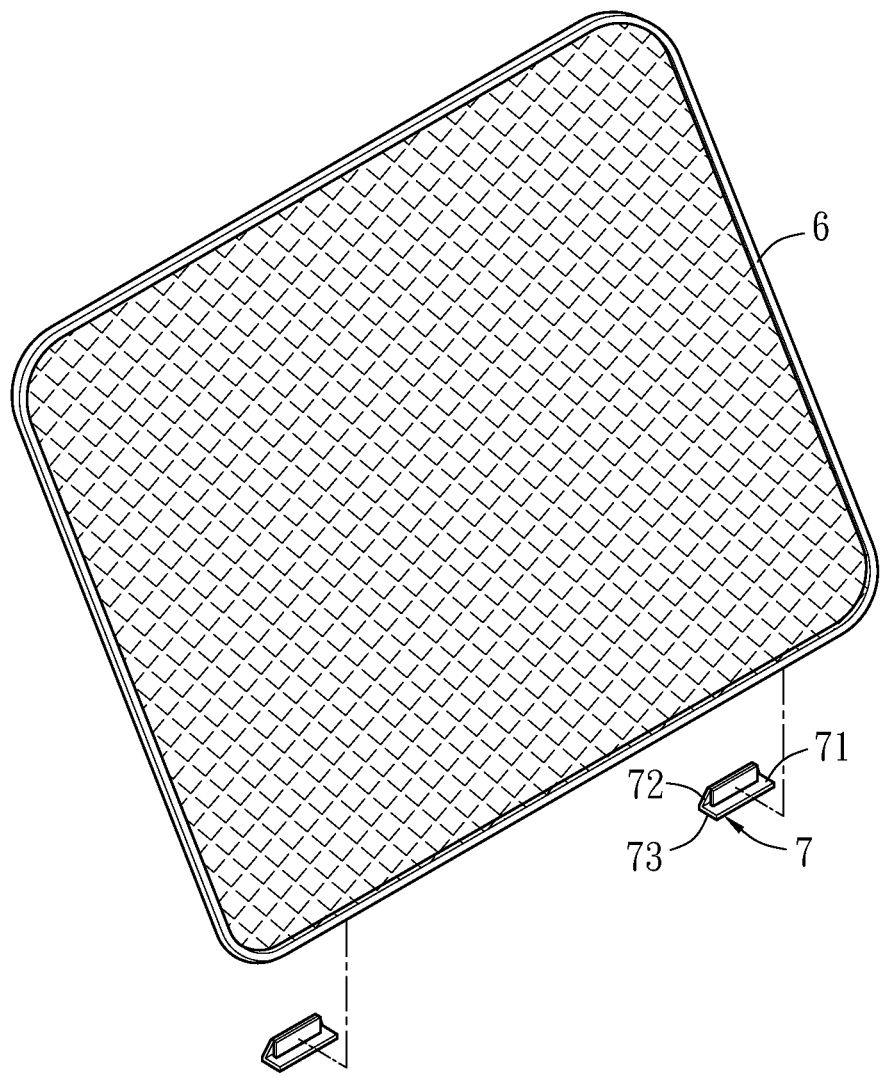
FIG. 2 is an exploded view of another conventional sunshade.
Figure 3:
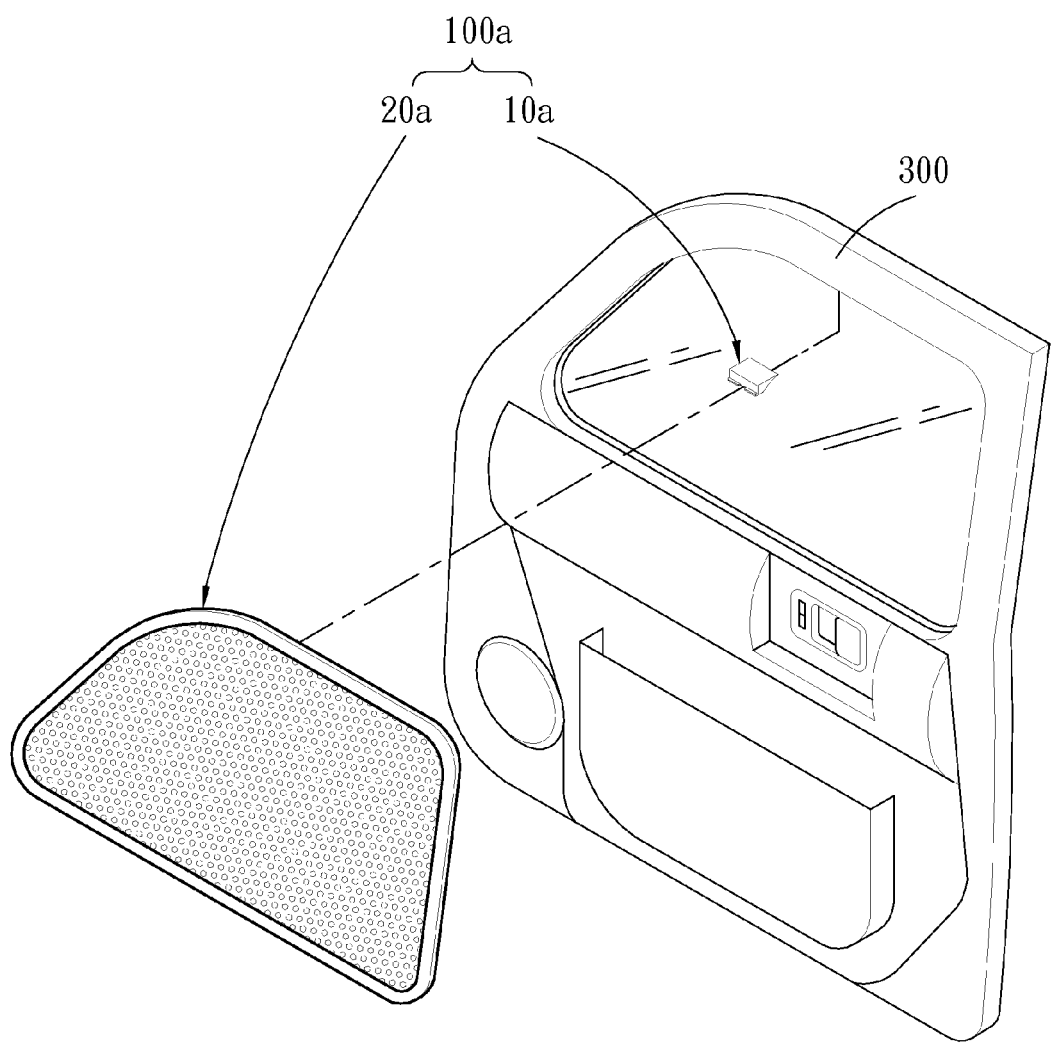
FIG. 3 is an exploded view of a first embodiment of the invention.

Please referring to FIG. 3, the present invention aims to provide a vehicle sunshade apparatus 100a that includes an anchor element 10a and a sunshade 20a, and is mainly to match a vehicle window frame 300 to cover a side window or the rear window of vehicles to block sunshine from outside of the window.

Figure 4A:
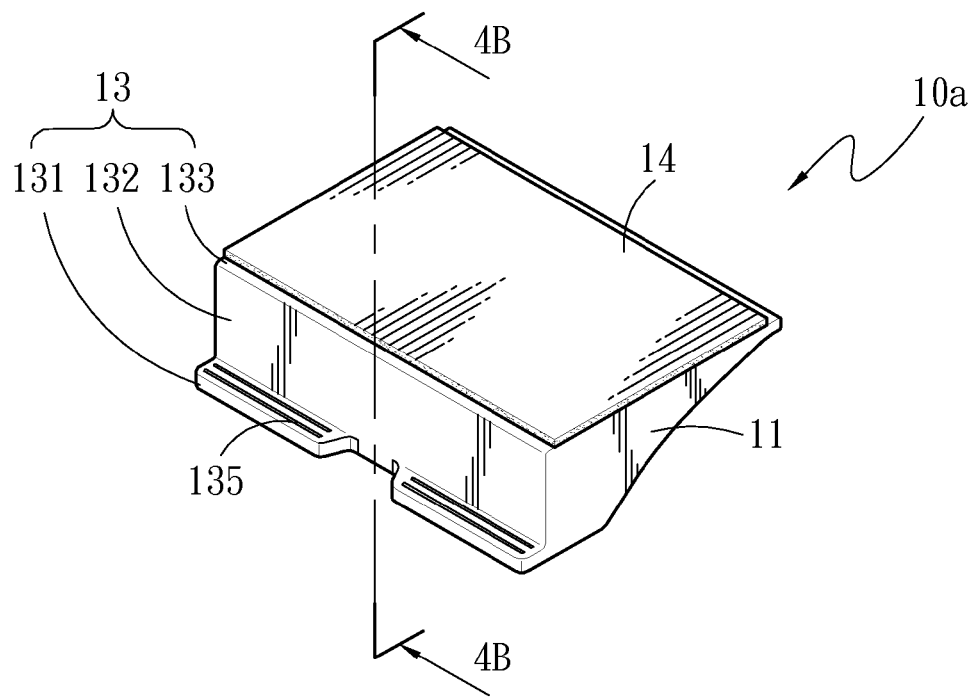
FIG. 4A is a perspective view of an anchor element of the invention.
Figure 4B:
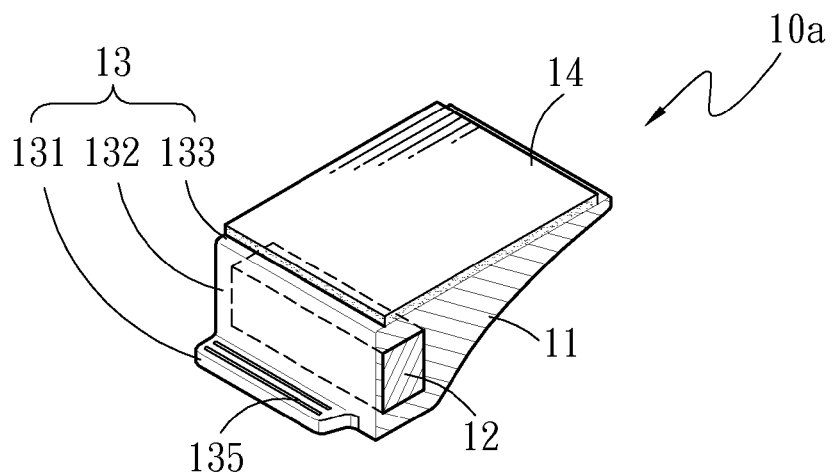
FIG. 4B is a sectional view taken on line 4B-4B in FIG. 4A.

More specifically, also referring to FIGS. 4A and 4B, the anchor element 10a includes a body 11, a magnet 12 located in the body 11 and a ladder portion 13 formed on the surface of the body 11. The ladder portion 13 includes a first platform 131 and a confining wall 132 adjacent to the first platform 131. The magnet 12 is preferably located in the body 11 abutting the confining wall 132 and has a magnetic pole facing the confining wall 132, thereby can generate a maximum magnetic force to attract the sunshade 20a on the ladder portion 13 in a secure manner. The first platform 131 has an anti-skid portion 135 at one side facing the confining wall 132 that is formed in a strip shape or a bulged-dots manner so that the sunshade 20a can be leaned thereon without slipping away. In the event that the anchor element 10a is matching the vehicle window frame 300 made of magnetic steel material, it can be directly attached to the vehicle window frame 300 by attraction via the magnet 12. In the event that the vehicle window frame 300 is made of non-magnetic material, the ladder portion 13 can include a second platform 133 connected to the confining wall 132 and formed a stair difference against the first platform 131, and the anchor element 10a further includes a coupling portion 14 located on the second platform 133 that can be a double-sided adhesive tape or hook & loop fastener or the like to be bonded to the non-magnetic vehicle window frame 300.

Figure 5:
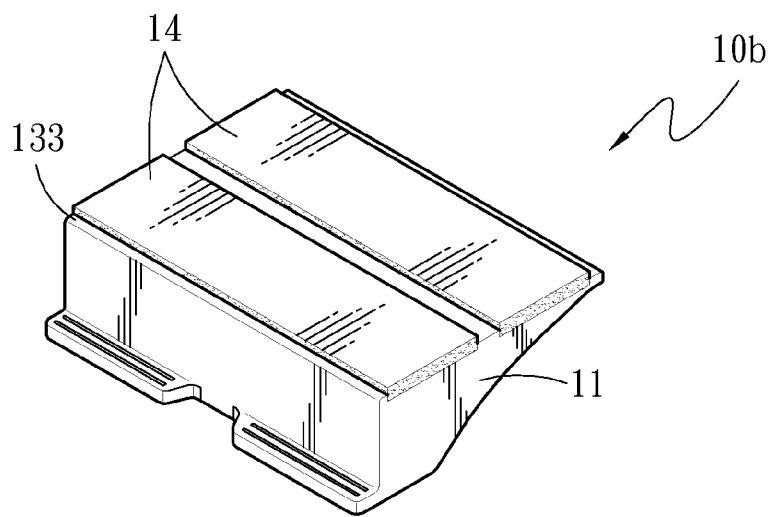
FIG. 5 is a perspective view of another embodiment of an anchor element of the invention.
Figure 6:
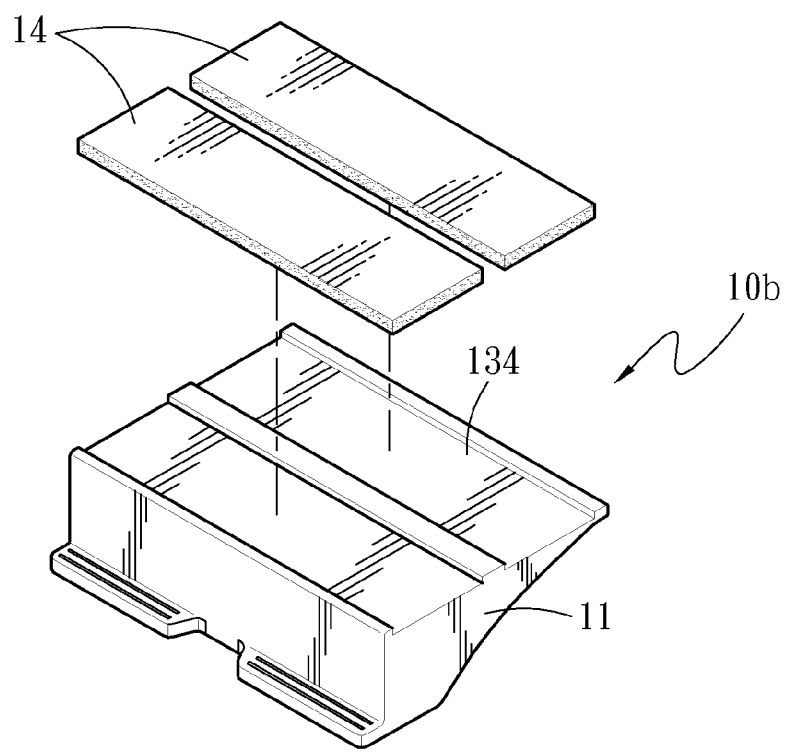
FIG. 6 is an exploded view of the anchor element in another embodiment of the invention.

Please referring to FIGS. 5 and 6, in another embodiment the coupling portion 14 of the anchor unit 10b can include a plurality of double-sided adhesive tapes, and the second platform 133 can have a recess 134 to hold the coupling portion 14. The recess 134 is formed at a depth slightly smaller than or equal to the thickness of the coupling portion 14 so that the surface of the coupling portion 14 is slightly higher than or equal to the surface of the second platform 133 to avoid increasing the distance between the first platform 131 and the vehicle window frame 300. In the event that the window frame of a corresponding vehicle model has preset apertures, tenons or hanging hooks, the coupling portion 14 also can be formed in a mating structure for screwing or latching with each other, the coupling fashion is not limited or restrictive.

Figure 7:
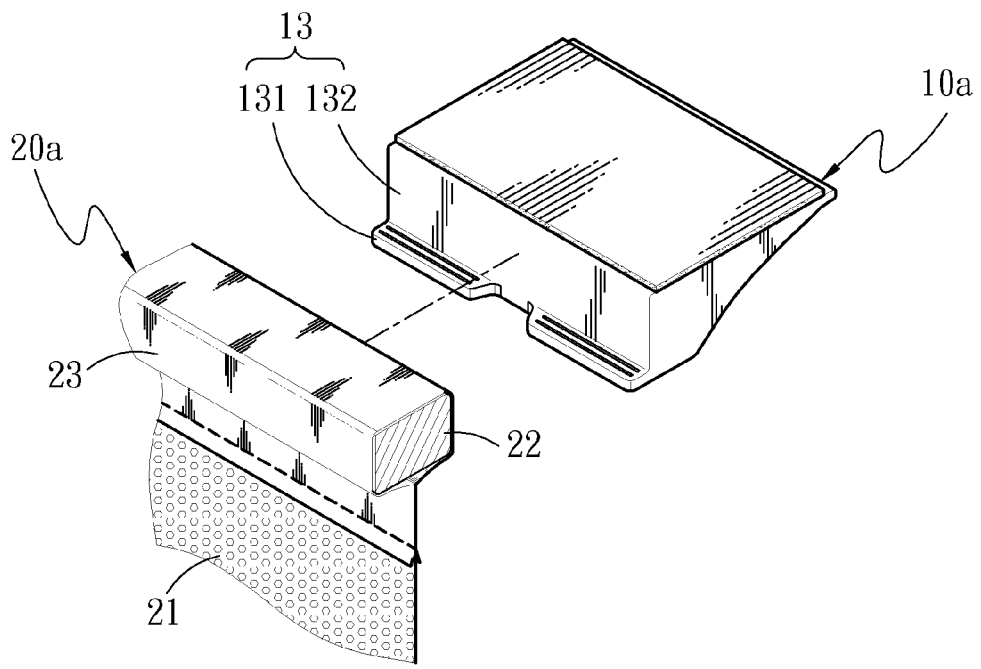
FIG. 7 is an exploded view of an anchor element and the sunshade of the invention.
Figure 8:
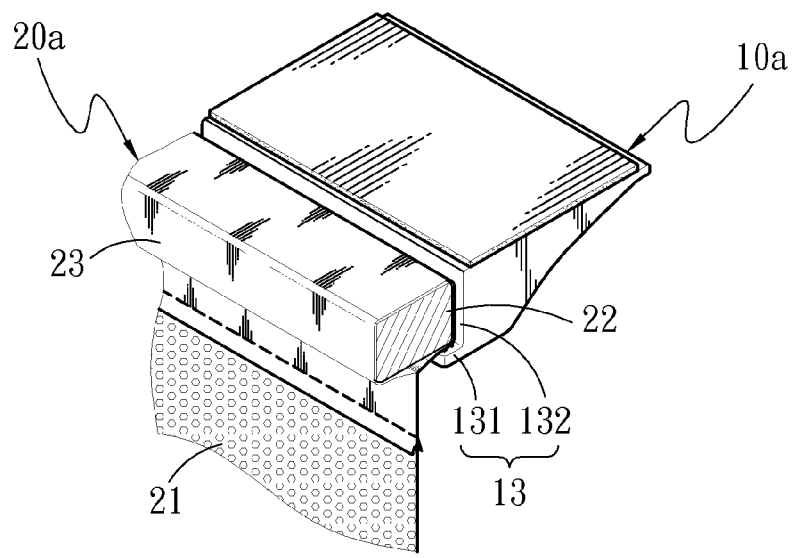
FIG. 8 is a perspective view of an anchor element and the sunshade of the invention in a coupling condition.

Please referring to FIGS. 7 and 8, the sunshade 20a is operable to attach to the ladder portion 13. The sunshade 20a includes a sunshade screen 21 and a frame 22 which surrounds the sunshade screen 21 and can be magnetized. When the sunshade 20a is connected to the ladder portion 13 the frame 22 leans on the confining wall 132 and the first platform 131, and attracted by the magnet 12 (also referring to FIG. 4B), and the first platform 131 is corresponding to the junction of the sunshade screen 21 and the frame 22. The sunshade screen 20a is made from flexible and twist-retractable material which is commonly known in the art, thus details are omitted herein.

Figure 9:
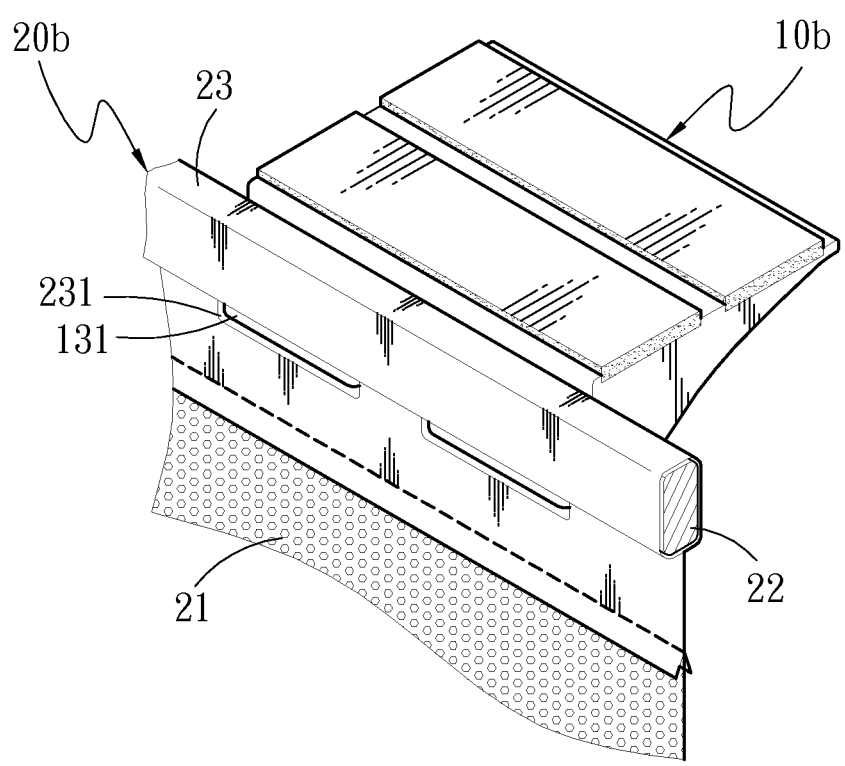
FIG. 9 is a perspective view of yet another embodiment of an anchor element and the sunshade of the invention in a coupling condition.

In addition, the sunshade 20a further includes a covering layer 23 to cover the frame 22 and connect to the sunshade screen 21. The frame 22 is formed at a thickness greater than the thickness of the sunshade screen 21. The covering layer 23 can be made from a fabric with a coarse surface to increase friction forces between the sunshade 20 and the ladder portion 13. In another embodiment, also referring to FIG. 9, in order to enhance bonding stability between the sunshade 20b and the ladder portion 13, the first platform 131 can be formed at a longer length to hold a greater portion of the frame 22, and the covering layer 23 can also have at least one opening 231 between the frame 22 and the sunshade screen 21 to allow the first platform 131 of the longer length to pass through.

Figure 10A:
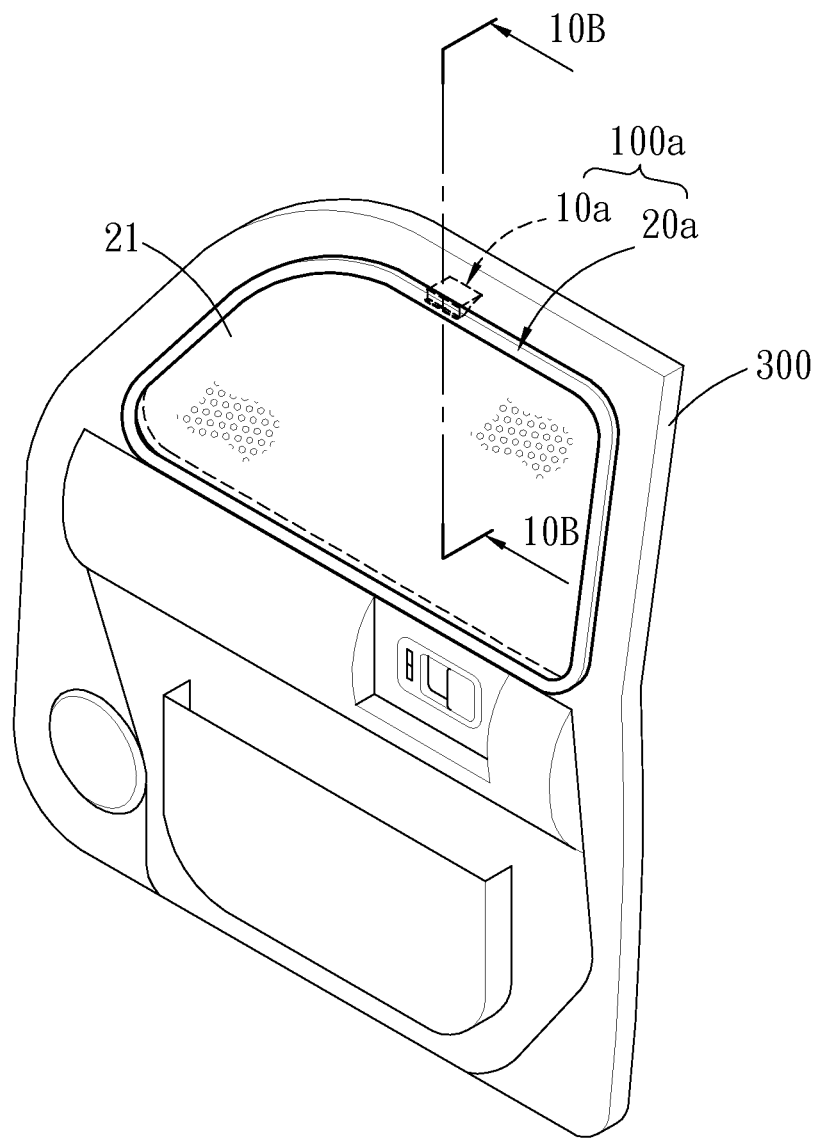
FIG. 10A is a perspective view of the first embodiment of the invention in an assembly condition.
Figure 10B:
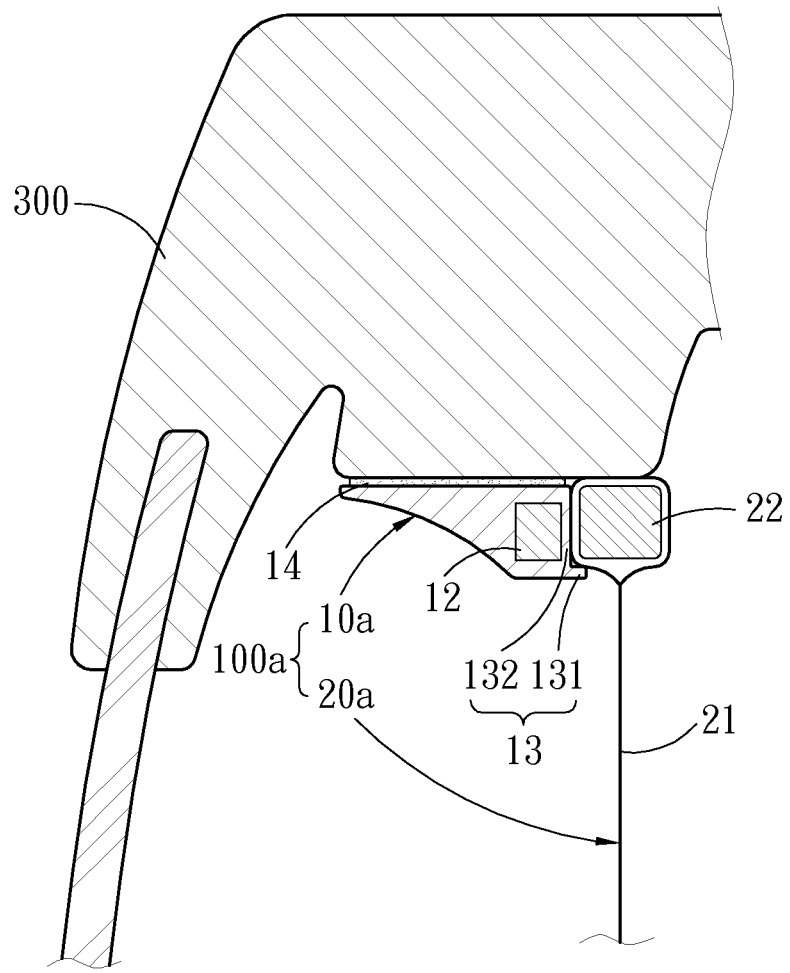
FIG. 10B is a sectional view taken on line 10B-10B in FIG. 10A.

Please refer to FIGS. 10A and 10B for a first embodiment of the invention in use conditions. The vehicle sunshade apparatus 100a aims to match a vehicle window frame 300. In this embodiment the vehicle sunshade apparatus 100a is located at a side window of a passenger seat to fully cover the side window. The sunshade screen 21 can be a translucent or opaque fabric. More specifically, the anchor element 10a is attached to one side of the vehicle window frame 22 through the coupling portion 14, and the sunshade 20a is connected to the ladder portion 13 so that one end of the frame 22 is attracted to the magnet 12 to get a horizontal support force and another end is held by the first platform 131 to get a vertical support force, thereby the sunshade 20a can be positioned on the vehicle body. Moreover, the sunshade 20a can be formed in a shape mating the vehicle window frame 300 to form a seamless coupling to achieve improved light blocking efficacy.

Figure 11:
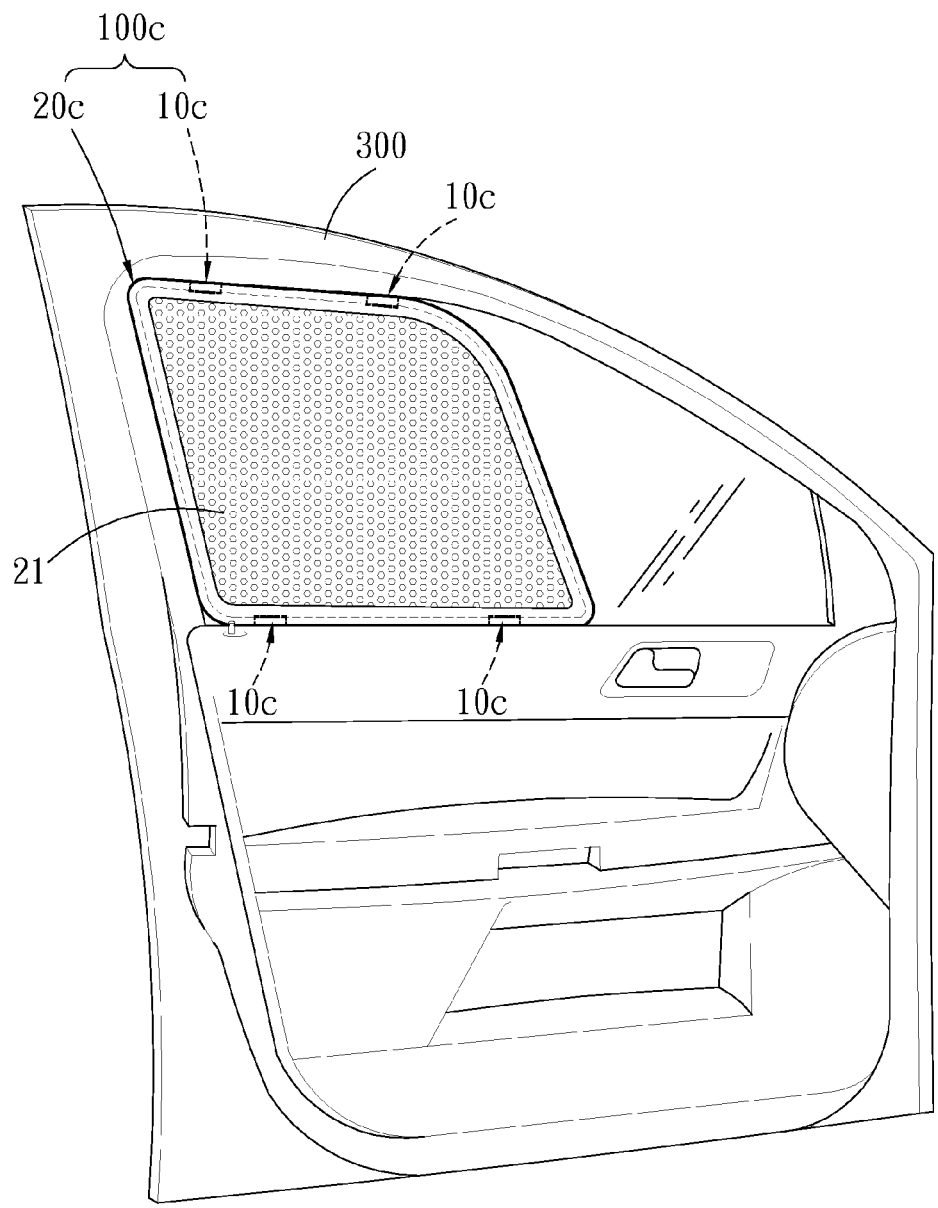
FIG. 11 is a plane assembly view of a second embodiment of the invention.

Please refer to FIG. 11 for a second embodiment of the invention. In this embodiment the sunshade 100c is deployed at a side window of the driver side, hence the sunshade screen 21 is a translucent net structure without hindering the driver from seeing outside ambience, and also without masking the rearview mirror. The vehicle window frame 300 has a plurality of anchor elements 10c located on multiple sides thereof so that the weight of the sunshade 20c can be distributed to each anchor element 10c.

Figure 12A:
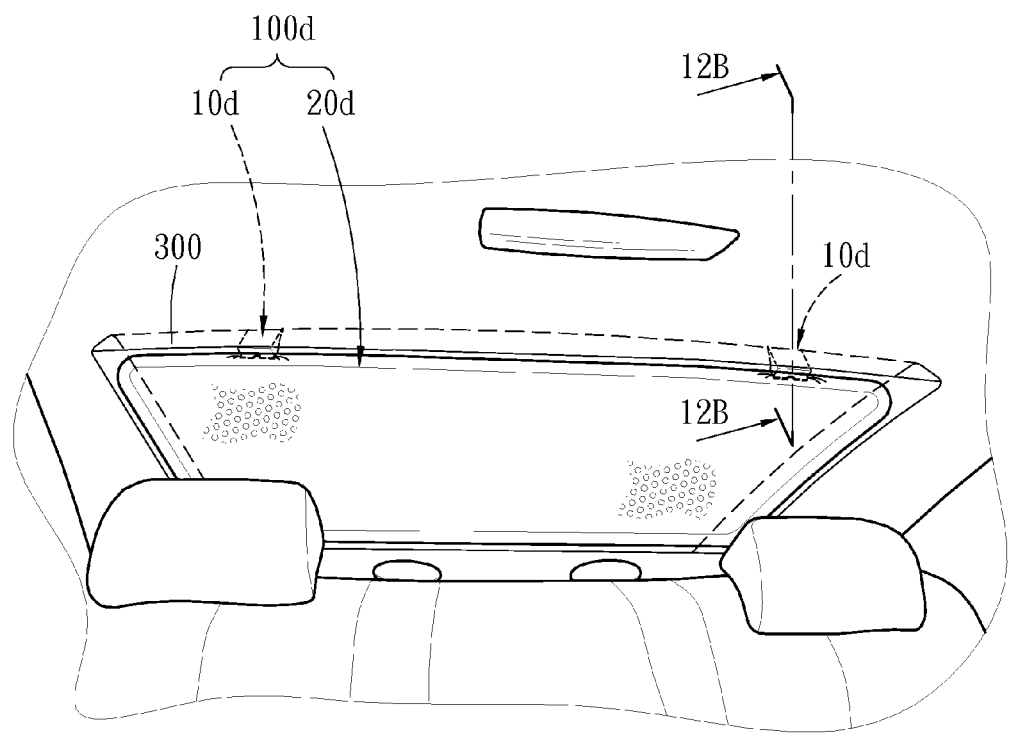
FIG. 12A is a perspective view of a third embodiment of the invention in an assembly condition.
Figure 12B:
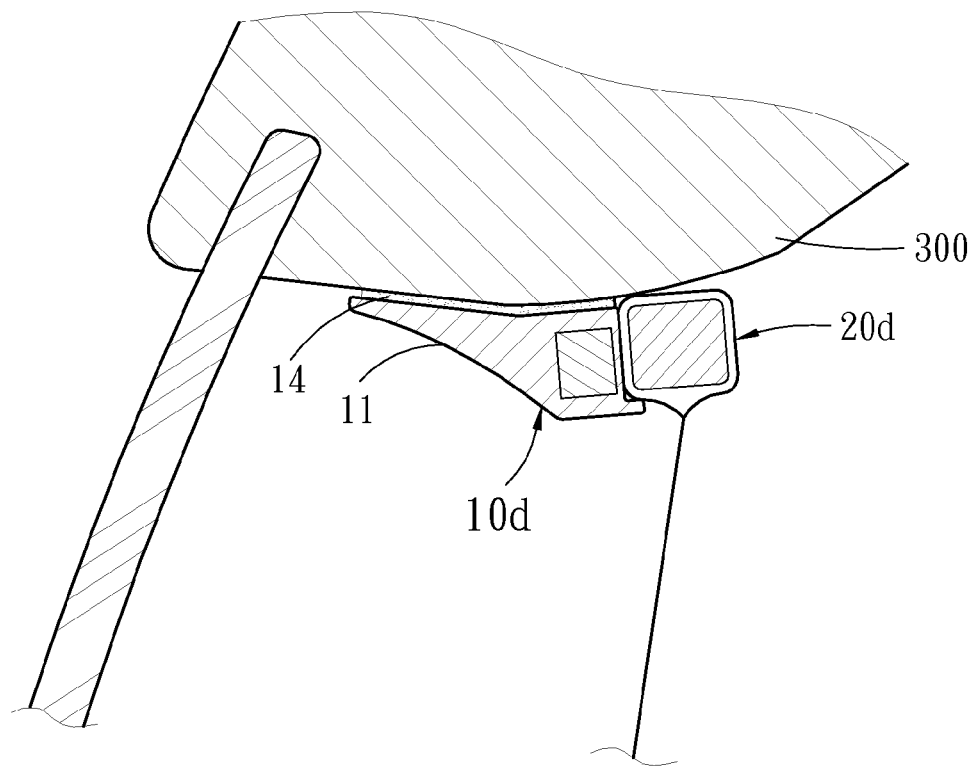
FIG. 12B is a sectional view taken on line 12B-12B in FIG. 12A.

Please refer to FIGS. 12A and 12B for a third embodiment of the invention. In this embodiment the vehicle sunshade apparatus 100d is deployed at the rear window of the vehicle. Considering the rear window of various types of vehicles can be designed differently, the vehicle window frame 300 could have corners or an arched surface that make fit coupling of the anchor element 10d with the vehicle window frame 300 impossible and could result in unsecured coupling of the coupling portion 14 such as a double-sided adhesive. Hence the body 11 of the coupling element 10d is preferably made from material with desired flexibility such as plastics, rubber or compounds thereof, and can be selected from the group consisting of polyvinyl chloride (PVC), thermo-Plastic Rubber (TPR) and other plastics or rubber that have desired flexibility. Thereby the body 11 can be installed flexibly and snuggly along the surface of the vehicle window frame 300.

Figure 13A:
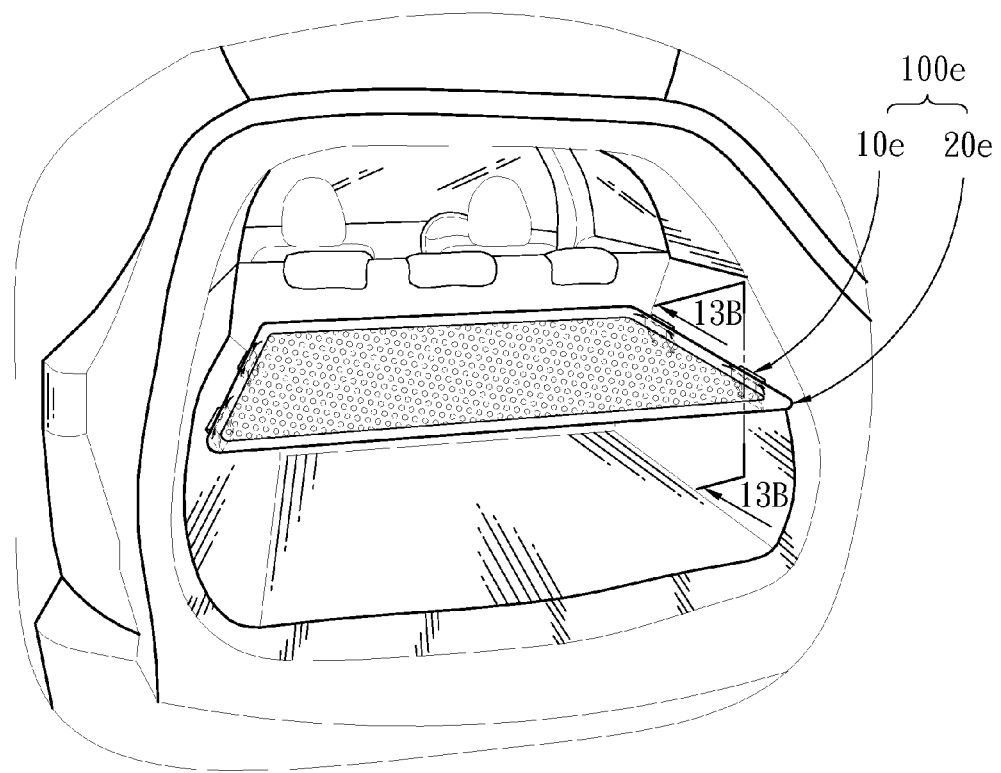
FIG. 13A is a perspective view of a fourth embodiment of the invention in an assembly condition.
Figure 13B:
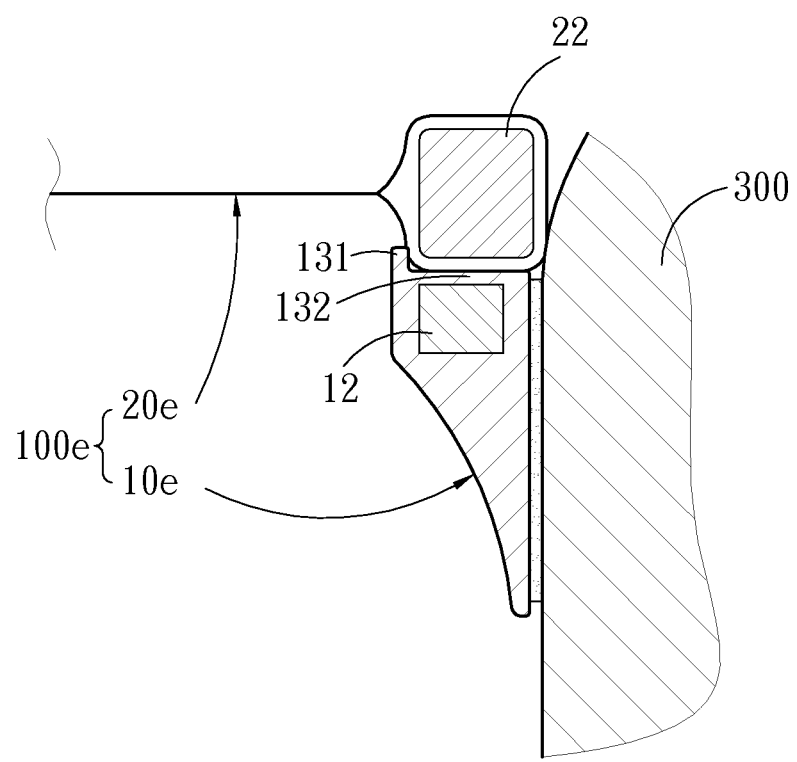
FIG. 13B is a sectional view taken on line 13B-13B in FIG. 13A.

Please refer to FIGS. 13A and 13B for a fourth embodiment of the invention. In this embodiment the vehicle sunshade apparatus 100e is deployed at the rear window of a recreational vehicle. Due to the rear window of such a vehicle type makes the interior space of the trunk visible directly, the sunshade in this embodiment can prevent other people outside the vehicle from peeping at articles held inside the vehicle. In this embodiment each anchor element 10e is connected to a side wall around the vehicle trunk and the first platform 131 faces upward so that the frame 22 of the sunshade 20e can be positioned on the confining wall 132 with the first platform 131 butting lateral sides of the frame 22 for anchoring. Moreover, the magnet 12 can provide attraction force to the sunshade 20e to prevent noise generation caused by shaking during driving of the vehicle.

As a conclusion, the sunshade of invention is anchored on the vehicle window frame or lateral sides of the vehicle body, hence can resolve the problem of increased vehicle body thickness caused by the anchor element that occurred to the prior techniques. Moreover, the anchor element includes a magnet and a first platform that provide horizontal and vertical support forces for the frame so that the sunshade can be securely coupled with the anchor element during driving of the vehicle, and the attraction provided by the magnet also can prevent noise generation caused by shaking of the vehicle body.

What is claimed is:

1. A vehicle sunshade apparatus installed in a vehicle, the vehicle sunshade apparatus comprising:
   an anchor element including a body, a magnet located in the body and a ladder portion formed on the surface of the body, the ladder portion including a confining wall, a first platform connected to the confining wall and extended away from the confining wall, a second platform connected to the confining wall and extended away from the first platform, and a coupling portion located on the second platform to couple with the vehicle, wherein the second platform forms a altitude difference against the first platform; and
   a sunshade which is removably connected to the ladder portion includes a sunshade screen and a frame surrounding the sunshade screen, the sunshade leaned against the confining wall and the first platform and attracted by the magnet when connected to the ladder portion, wherein the first platform is supported by the first platform.

2. The vehicle sunshade apparatus of claim 1, wherein the coupling portion is a double-sided adhesive tape or hook and loop fastener.

3. The vehicle sunshade apparatus of claim 2, wherein the second platform includes a recess to hold the coupling portion, and the recess is formed at a depth smaller or equal to the thickness of the coupling portion.

4. The vehicle sunshade apparatus of claim 1, wherein the sunshade further includes a covering layer to cover the frame and connect to the sunshade screen, and the frame is formed at a thickness greater than the thickness of the sunshade screen.

5. The vehicle sunshade apparatus of claim 4, wherein the covering layer includes at least one opening formed between the frame and the sunshade screen to allow the first platform to pass through.

6. The vehicle sunshade apparatus of claim 1, wherein the first platform includes an anti-skid portion at one side facing the confining wall.

7. The vehicle sunshade apparatus of claim 1, wherein the magnet is located in the body proximate the confining wall and has a magnetic pole facing the confining wall.

8. The vehicle sunshade apparatus of claim 1, wherein the body is flexible and made from material selected from the group consisting of plastics and rubber.

* * * * *

UNITED STATES PATENT AND TRADEMARK OFFICE
CERTIFICATE OF CORRECTION

PATENT NO. : 9,499,030 B1
APPLICATION NO. : 14/723184
DATED : November 22, 2016
INVENTOR(S) : Jing-Shyong Gong Page 1 of 1

It is certified that error appears in the above-identified patent and that said Letters Patent is hereby corrected as shown below:

In the Claims

In Column 6, Line 18, change "portion, wherein the first platform is supported by the" to --portion, wherein the frame is supported by the--.

Signed and Sealed this
Sixth Day of February, 2018

Joseph Matal
*Performing the Functions and Duties of the
Under Secretary of Commerce for Intellectual Property and
Director of the United States Patent and Trademark Office*